United States Patent
Roeder

[11] 3,845,942
[45] Nov. 5, 1974

[54] TORCH CUTTING MACHINE
[75] Inventor: Georg Roeder, Frankfurt/Main, Germany
[73] Assignee: Messer Griesheim GmbH, Frankfurt, Germany
[22] Filed: Oct. 17, 1972
[21] Appl. No.: 298,350

[52] U.S. Cl............ 266/23 K, 33/126.6, 266/23 B, 266/23 L, 266/23 M, 408/235
[51] Int. Cl.............................................. B23k 7/10
[58] Field of Search..... 266/23 B, 23 E, 23 F, 23 K, 266/23 L, 23 M, 23 R; 33/126.6, 126.7; 408/235; 308/6 C

[56] References Cited
UNITED STATES PATENTS

| | | | |
|---|---|---|---|
| 1,921,888 | 8/1933 | Schmidt | 266/23 F |
| 2,289,786 | 7/1942 | Jones | 266/23 M |
| 2,499,938 | 3/1950 | Ward | 266/23 B |
| 2,930,131 | 3/1960 | Mayes | 33/126.7 A |
| 3,216,032 | 11/1965 | Hoffman | 408/235 X |
| 3,446,540 | 5/1969 | Geffner | 308/6 C |
| 3,757,638 | 9/1973 | Martin | 408/235 |
| 3,809,308 | 5/1974 | Roeder et al | 266/23 M |

Primary Examiner—Roy Lake
Assistant Examiner—Craig R. Feinberg
Attorney, Agent, or Firm—Connolly and Hutz

[57] ABSTRACT

A torch cutting machine is provided with at least one vertically adjustable torch suspension means, which is secured to a bearing bar movable by means of a drive system with a weight compensation device being connected to the bearing bar.

9 Claims, 3 Drawing Figures

TORCH CUTTING MACHINE

BACKGROUND OF THE INVENTION

This invention relates to a torch cutting machine with at least one vertically adjustable torch suspension means which is secured to a bearing bar movable by means of a drive system.

In mechanical torch or plasma cutting, the cutting tool is secured to a particular support means which is in turn mounted on the torch cutting machine. The said particular support means, the torch suspension means, moves with the cutting tool (cutting or plasma torch, laser) attached to it over the workpiece to be cut. The information at the path along which and hence the direction in which the torch suspension means is required to travel is dictated to the torch cutting machine, namely either manually by the operator or automatically by scanning or sensing of torch cutting patterns by means of e.g., photoelectric scanning devices, or by numerical information which is e.g., punched into a paper tape and influences drive motors of the torch cutting machine which are correspondingly prepared electronically or electrically.

During the torch or plasma cutting operation, it is necessary for the cutting torch to be maintained with the cutting nozzle at a specific interval above the workpiece to be cut, in order to obtain optimum cutting results.

For this purpose the torch suspension means to which the cutting torch with the cutting nozzle is secured is provided with a vertical guide device which is moved by a motor through a transmission. The control of the drive motor for this vertical movement can be performed either manually, by the operator actuating a switch for the upward or downward movement, or else automatically, by an automatically operating scanning device constantly monitoring an interval, prescribed once for all, between the bottom edge of the nozzle and the top edge of the workpiece, and performing a correction in the case of deviations from the prescribed value.

The apparatus currently known for the said motorized or automatic vertical adjustment of the cutting tool — automatic means that the interval between the bottom edge of the nozzle and the top edge of the workpiece, when once adjusted, is maintained automatically, the necessary condition obviously being the presence of a motorized torch height adjustment system — generally employed as drive motor a high speed collector motor (approximately 4 – 8,000 revolutions per minute), which is operated by alternating voltage series wound or else by direct voltage as a direct current shunt wound motor.

Owing to the load to be raised and lowered (vertical guide device, cutting tool, marking tool, etc...) and owing to the high speed of the drive motor, in conjuntion with the relatively low nominal torque of the said motor and the low stroke velocities which are necessary to move the cutting tool at the desired interval in each case between the bottom edge of the cutting nozzle and the top edge of the workpiece, transmissions or gears with a large number of stages are required which are therefore complicated and expensive. Because the interval between the bottom edge of the nozzle and the top edge of the workpiece, when once adjusted, is required to be maintained until a correction becomes necessary as a result of irregularities in the top edge of the workpiece, these gears must be self-locking. This self-locking action is generally obtained in the case of the majority of current forms of construction, by an additional worm drive in the multiple stage gear. Other possibilities are electromagnetic brakes which are provided within the gear or are arranged additionally on a second shaft end of the drive motor.

Furthermore, gears when once designed are only intended for mechanical connection to a single type of motor and for one load to be raised and lowered, adapted to the drive conditions. Certain upward and downward tolerances with respect to the load are acceptable, but according to experience only within the order of magnitude of up to ± 15 percent. Since furthermore the magnitude of the raising and lowering movements already differ substantially from the value originally aimed at, and electrical or electronic devices are necessary in order to arrive approximately at the desired raising and lowering movements. However, these special measures involve not only an additional outlay, and hence an increase in costs, but also a reduction in the useful life of the drive motor and of the gear, which simultaneously increases the proneness to faults.

Since variations in the loads to be raised and lowered cannot be avoided — more particularly with large cutting machine, but also with small and medium torch cutting machines — this being conditioned by complimentary appliances which have to be mounted upon the torch suspension means additionally to the actual cutting torch — e.g., marking tools — it is necessary to select a higher capacity type of motor in such cases, and this involves a partial modification of the gear. The vertical torch adjustment in rotating multiple torch units or the like necessitates a further motor/gear variant in order to conform to the requirements in such cases.

This large number of variant constructions calls for a comparatively complicated mechanical fabrication including erection, complicates service and increases the costs for holding stocks of spare parts both by the manufacture and also by the user. It was hitherto impossible to employ only one variant which would be adequate for all cases of need — e.g., the version for the large torch cutting machines — because the costs would be disproportionate for small and medium sized machines.

SUMMARY OF INVENTION

It is the aim of this invention to produce an adjustable torch suspension means for which the adjustment can be performed without being influenced by the weight of the suspension means.

The invention consists in the fact that the bearing bar is connected to a weight compensation device.

By this means it is advantageously achieved that the weight of the torch suspension means and of the bearing bar is almost totally compensated. It is thereby possible to use an adjusting motor which is extremely small as regards capacity (torque) and overall dimensions, because substantially only the frictional forces present remain to be overcome by the motor. Furthermore, no braking means such as worm gears or magnetic brakes are necessary to enable a position once having been reached to be maintained until the next correction.

As an advantageous further development of the invention it is proposed that the weight compensation device is provided within the drive system for the bearing bar and is constructed as a spring band which is wound under tension, on the one hand counter to the torque direction dictated by the weight of the bearing bar with the attached appliances upon a work roller firmly attached to a shaft of the drive system, and on the other hand upon a storage roller.

This makes it possible to use a standard gear which is more economic than the gears hitherto used, possesses higher efficiency due to the omission of the braking means, and which is adequate for all the load variations which occur in practice in the case initially described. The load, which are different according to the nature of the torch suspension means, but are constant, are compensated by the appropriately dimensioned spring band which is under bias tension.

For this purpose it is proposed that the spring band section which is wound upon the storage roller exhibits a winding direction which is opposite to the winding direction of the spring band section upon the work roller. This produces an S-shaped arrangement of the spring band.

It is particularly advantageous to arrange the work roller upon a driving shaft which is provided in the high speed section of the drive system. This makes it possible to have the spring band small and therefore inexpensive.

THE DRAWINGS

FIG. 2A is a view similar to FIG. 2 showing plural weight compensation means wherein the components of the additional weight compensation device are indicated by the suffix a.

DETAILED DESCRIPTION

Figure 1:
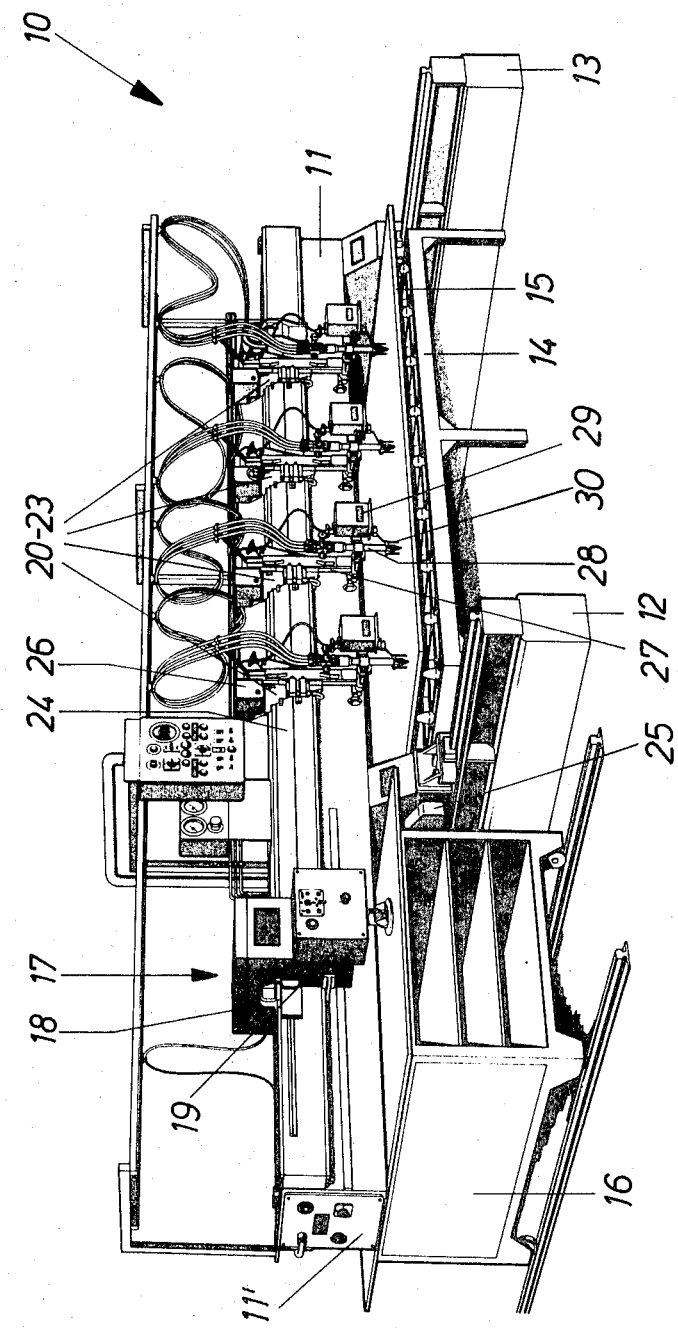
FIG. 1 shows a torch cutting machine with the adjustable torch suspension means according to the invention.

The torch cutting machine, designated 10 in FIG. 1, has a longitudinal carriage 11 with a gib arm 11'. The longitudinal carriage 11 is arranged transportably (motor 25) on two longitudinal tracks 12, 13.

Between the logitudinal tracks 12, 13 a table 14 supports the metal plate 15 to be cut, and the drawing pattern to be scanned rests upon a transportable template table 16 arranged beneath the gib arm 11'. On the longitudinal carriage 11 is mounted a transverse carriage 17 which supports a drive system 18 for the transverse movement of the carriage 17 and of a photoscope 19 and also has four torch carriages 20–23 attached slidingly to the longitudinal carriage 11. The torch carriages 20–23 are connected firmly mechanically to the photoscope 19 through a thrust bar 24. During operation of the torch cutting machine 10, the photoscope 19 follows, at an adjusted speed, the line of a drawing which rests upon the table 16. Within the photoscope 19, through known electrical components (resolvers, amplifiers etc.) separate transport commands are passed to the drive motors 25 (longitudinal movement) and 18 (transverse movement), and the torch carriages and the photoscope are thus moved in synchronism.

As FIG. 1 clearly shows, each torch carriage 20–23 has a drive system 26 for vertical adjustment of the torch 28 fixed on a bearing bar 27. Furthermore, a capacitive sensing device 29, known per se, is secured to the bearing bar 27, and a sensor 30 as actual value transmitter for the vertical torch adjustment is secured to the torch 28. These loads (torch 28, sensing device 29) which attacks the bearing bar 27 are compensated according to the invention by a weight compensation device connected to the bearing bar 27 and illustrated in detail in FIG. 2.

Figure 2:
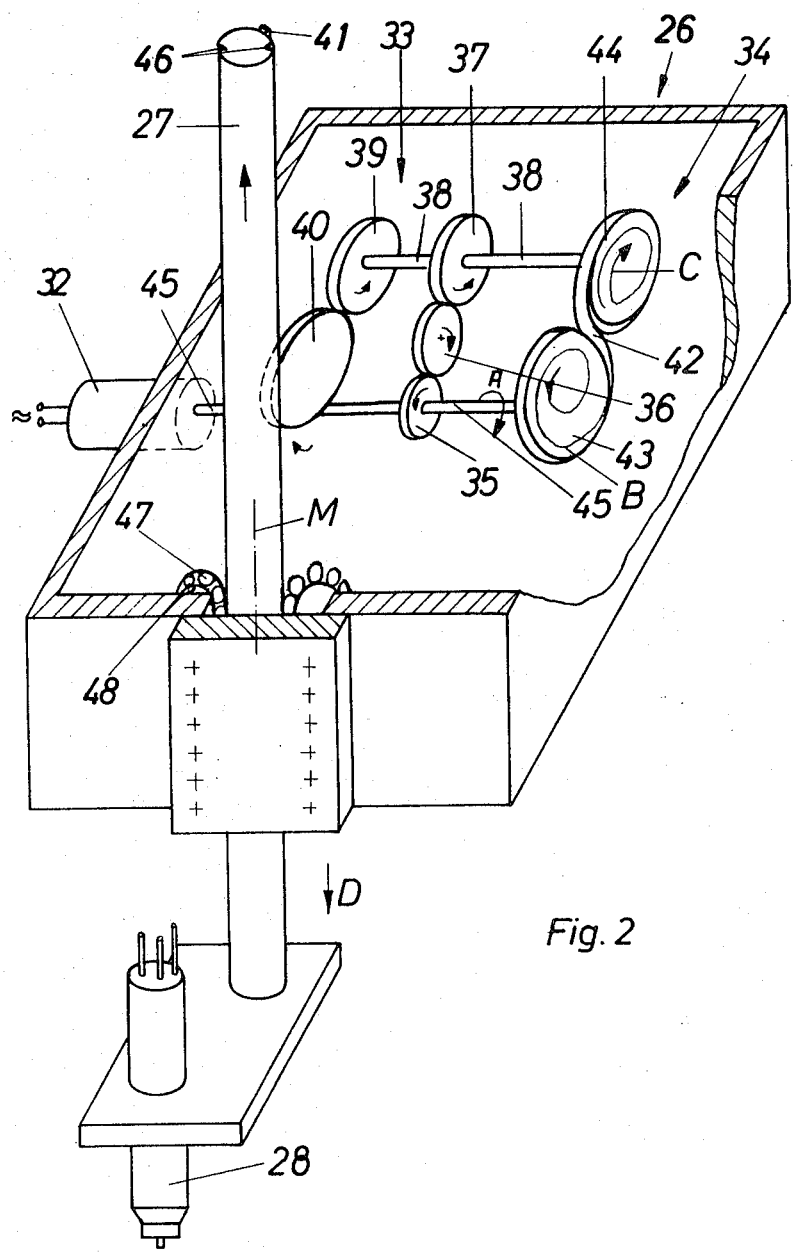
FIG. 2 shows a schematic perspective view of the torch suspension means according to the invention.

According to FIG. 2, the drive system 26 for the bearing bar 27 is constituted by a motor 32, a gear set 33 and the weight compensation device 34.

From the motor 32, the motor torque is transmitted through a toothed pinion 35 to a gearwheel 36 and further to a gearwheel 37. From here the torque passes through a shaft 38 to a gearwheel 39 and from thence to a gearwheel 40 which meshes with a tooth system 41 of the bearing bar 27.

The weight compensation device 34 according to the invention comprises a spring band 42 which is wound under tension, on the one hand upon a work roller 43 and on the other hand upon a storage roller 44. In the exemplary embodiment according to FIG. 2, the work roller 43 is firmly attached to the shaft 45 arranged in the high speed section of the gear set 33. The storage roller 44 is mounted with free mobility about its central axis upon the prolongation of the shaft 38 which may be considered a remote shaft. This system is generally similar to the tape tensioning device of U.S. Pat. No. 2,930,131.

The spring band 42 is wound upon the work roller 43 counter to the torque direction A dictated by the weight of the torch 28 and sensing device 29 (FIG. 1) — that is to say in the direction of the arrow B.

The spring band 42 is wound upon the storage roller 44 in the direction of the arrow C, which is opposite to the winding direction B (work roller 43).

The change in direction of the spring band 42 produces an S-shaped arrangement. The spring band 42 wound under tension constitutes a spring system with an almost horizontal characteristic (constant spring force) which compensates the load to be raised and lowered — e.g., 14Kg (direction of arrow D) over the entire raising and lowering range.

This load exerts upon the bearing bar 27 and upon the gear wheels of the gear set 33 a specific torque (torque direction A) which is dissipated by the spring torque acting in the direction B.

The spring band 42 is preferably so dimensioned and provided with such a bias tension that a spring work moment is achieved which corresponds approximately to the sum of the load moment and the loss moment existing due to the friction in the guide system (bearing bar) and the efficiency of the gear. The spring band consists, for example, of stainless steel with a modulus of elasticity of 19,000 Kp/mm$^2$, and is wound tightly in S-shaped arrangement upon a work roller of 68 mm diameter and a storage roller of 65 mm diameter.

The weight of the bearing bar 27, torch 28, scanning device 29 and any further appliances secured to the bearing bar 27 is compensated by the device according to the invention. The motor 32 is only required to set the system in motion — i.e., to move the bearing bar 27 upwards or downwards — during which the motor 32 has to overcome virtually only the existing frictional forces and can therefore be of very small dimensions. During the upward movement of the bearing bar 27 by the motor 32 the storage roller 44 receives spring band which is unwound from the work roller 43 and makes it available again during the downward movement. In order to keep the frictional resistances as low as possible, according to the invention the bearing bar 27 is constructed with mutually opposite grooves 46. The grooves 46 are engaged by balls 47 of a schematically illustrated ball bearing guide system 48 with recirculating balls. This ball bearing guide system produces a permanently constant starting and rolling friction resistance. Furthermore any rotation of the bearing bar 27 about the central axis M is prevented.

Figure 2A:
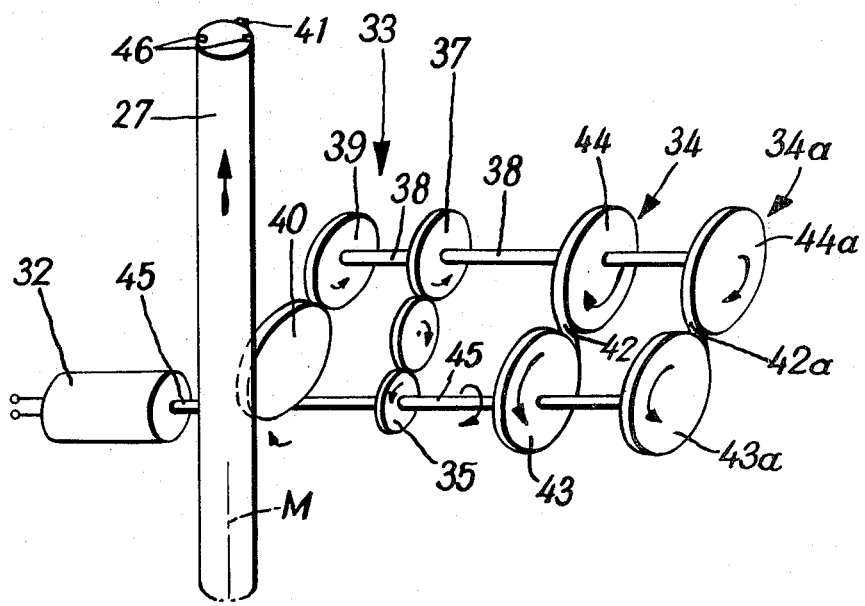

A spring of S-shaped arrangement is provided in the case of the exemplary embodiment illustrated. It is of course also possible to arrange a plurality of springs juxtaposed upon the same or different work and storage rollers such as schematically illustrated in FIG. 2A. This is advantageous more particularly with respect to the fracture of a spring because in that case the other spring or springs cause the bearing bar with the torch and auxiliary appliances to move slowly and not suddenly downwards, thereby preventing serious damage. The provision of a plurality of springs further makes it advantageously possible to compensate relatively heavy loads without making the device excessively large.

According to the invention the motor 32 is preferably a slow running stepping motor (60 – 100 revolutions per minute). This motor has a relatively high torque and further makes it possible to use a gear provided with from one to three gear stages fewer than those hitherto used and of correspondingly simpler construction. The stepping motor is preferably operated by alternating voltage (50 or 60 c/s) and therefore operates as a slow running synchronous motor. Synchronous motors are in fact self starting, but are subject to limitations with respect to the load inertia moment. It is only the use of a weight compensating spring which makes possible in the present case of application the use of a stepping motor synchronous in operation (alternating voltage operation) — i.e., the essential self-starting is ensured without the necessity of using a starting clutch etc.

The stepping motor has a permanent magnet as rotor. The residual magnetism of this rotor generates a torque which maintains the rotor in its position when the field winding is unexcited.

In case the said residual torque is inadequate to fix the rotor in its position, it is proposed to generate a rotor holding torque by the additional application of a specific direct voltage to the field winding.

It is of course also possible to operate the stepping motor with an appropriately controlled direct voltage instead of with alternating voltage.

What is claimed is:

1. A torch cutting machine including at least one cutting torch, a vertically arranged bearing bar, said torch mounted to said bearing bar, a drive system operatively connected to said bearing bar for moving said bearing bar and said torch suspended therefrom up and down, said drive system including a drive shaft, said drive system further including transmission means between said bearing bar and said drive shaft whereby the weight of said bearing bar and said torch exerts a torque direction to said drive shaft, said transmission means including a gearing system associated with said bearing bar, a weight compensation device for counter balancing said torque, said weight compensation device including a work roller fixedly mounted on said drive shaft whereby said torque direction is also urged to said work roller, a storage roller mounted generally aligned with said work roller, a spring band wound under tension on said work roller counter to said torque direction, and the end of said spring band remote from said work roller being wound on said storage roller.

2. Torch cutting machine according to claim 1, characterized in that a plurality of weight compensation devices are connected to the bearing bar.

3. Torch cutting machine according to claim 1 wherein said transmission means includes a remote shaft, a first gear train between said drive shaft and said remote shaft, a second gear train between said remote shaft and said bearing bar, and said storage roller being freely mounted on said remote shaft.

4. Torch cutting machine according to claim 1, characterized in that the spring band wound upon the storage roller exhibits a winding direction which is opposite to the winding direction of the end of the spring band wound upon the work roller.

5. Torch cutting machine according to claim 4, characterized in that the storage roller is freely mounted upon a further shaft in the drive system.

6. Torch cutting machine according to claim 5, characterized in that the drive system includes a stepping motor as its drive motor.

7. Torch cutting machine according to claim 6, characterized in that the stepping motor is operated by alternating voltage.

8. Torch cutting machine according to claim 6, characterized in that the stepping motor has a field winding connected to a direct voltage supply source.

9. Torch cutting machine according to claim 8, characterized in that the bearing bar includes longitudinal grooves in which recirculating balls of a ball bearing guide system engage.

* * * * *